US009235902B2

(12) United States Patent
Jahanshahi et al.

(10) Patent No.: US 9,235,902 B2
(45) Date of Patent: Jan. 12, 2016

(54) IMAGE-BASED CRACK QUANTIFICATION

(75) Inventors: Mohammad R. Jahanshahi, Pasadena, CA (US); Sami Masri, Pasadena, CA (US)

(73) Assignee: UNIVERSITY OF SOUTHERN CALIFORNIA, Los Angeles, CA (US)

(*) Notice: Subject to any disclaimer, the term of this patent is extended or adjusted under 35 U.S.C. 154(b) by 641 days.

(21) Appl. No.: 13/567,969

(22) Filed: Aug. 6, 2012

(65) Prior Publication Data
US 2013/0034305 A1    Feb. 7, 2013

Related U.S. Application Data

(60) Provisional application No. 61/515,024, filed on Aug. 4, 2011, provisional application No. 61/515,040, filed on Aug. 4, 2011, provisional application No. 61/515,022, filed on Aug. 4, 2011.

(51) Int. Cl.
    *G06K 9/46*    (2006.01)
    *G06T 7/00*    (2006.01)
    *G06K 9/00*    (2006.01)

(52) U.S. Cl.
    CPC .......... *G06T 7/0081* (2013.01); *G06K 9/00624* (2013.01); *G06T 7/0004* (2013.01); *G06T 7/0091* (2013.01); *G06T 2207/20036* (2013.01); *G06T 2207/20081* (2013.01); *G06T 2207/30132* (2013.01)

(58) Field of Classification Search
    None
    See application file for complete search history.

(56) References Cited

U.S. PATENT DOCUMENTS

| 5,073,819 A | 12/1991 | Gates et al. |
|---|---|---|
| 5,225,676 A | 7/1993 | Matsuya |
| 5,835,619 A | 11/1998 | Morimoto et al. |
| 6,615,648 B1 | 9/2003 | Ferguson et al. |

(Continued)

FOREIGN PATENT DOCUMENTS

| EP | 1995592 A1 | 11/2008 |
|---|---|---|
| JP | 2011-242293 A | 12/2011 |

(Continued)

OTHER PUBLICATIONS

Snavely, N., Seitz, S. M., & Szeliski, R. (Jul. 2006). Photo tourism: exploring photo collections in 3D. In ACM transactions on graphics (TOG) (vol. 25, No. 3, pp. 835-846). ACM.*

(Continued)

*Primary Examiner* — Sumati Lefkowitz
*Assistant Examiner* — David Perlman
(74) *Attorney, Agent, or Firm* — McDermott Will & Emery LLP

(57) ABSTRACT

Contact-less remote-sensing crack detection and/or quantification methodologies are described, which are based on three-dimensional (3D) scene reconstruction, image processing, and pattern recognition. The systems and methodologies can utilize depth perception for detecting and/or quantifying cracks. These methodologies can provide the ability to analyze images captured from any distance and using any focal length or resolution. This adaptive feature may be especially useful for incorporation into mobile systems, such as unmanned aerial vehicles (UAV) or mobile autonomous or semi-autonomous robotic systems such as wheel-based or track-based radio controlled robots, as utilizing such structural inspection methods onto those mobile platforms may allow inaccessible regions to be properly inspected for cracks.

16 Claims, 7 Drawing Sheets

(a)

(b)

(56) References Cited

U.S. PATENT DOCUMENTS

| | | | |
|---|---|---|---|
| 6,682,261 | B1 | 1/2004 | Karamihas et al. |
| 6,813,592 | B1 | 11/2004 | Dhondt |
| 6,983,065 | B1* | 1/2006 | Akgul et al. .................. 382/141 |
| 8,606,030 | B2 | 12/2013 | Ning |
| 8,649,557 | B2 | 2/2014 | Hyung et al. |
| 8,873,837 | B2 | 10/2014 | Jahanshahi et al. |
| 2005/0207673 | A1* | 9/2005 | Takane et al. .................. 382/286 |
| 2006/0058974 | A1 | 3/2006 | Lasiuk et al. |
| 2008/0056532 | A1* | 3/2008 | Alasia et al. .................. 382/100 |
| 2008/0262345 | A1 | 10/2008 | Fichtinger et al. |
| 2008/0292183 | A1* | 11/2008 | DeLuca et al. ................ 382/167 |
| 2009/0051082 | A1 | 2/2009 | Nakamura et al. |
| 2009/0110292 | A1* | 4/2009 | Fujimura et al. .............. 382/203 |
| 2010/0104168 | A1 | 4/2010 | Dobbe |
| 2010/0198517 | A1 | 8/2010 | Scott et al. |
| 2011/0066390 | A1 | 3/2011 | MacLeod et al. |
| 2011/0135215 | A1* | 6/2011 | Tay ............................... 382/255 |
| 2012/0257086 | A1 | 10/2012 | Nakasugi et al. |
| 2013/0018575 | A1 | 1/2013 | Birken et al. |
| 2013/0051652 | A1 | 2/2013 | Calvet et al. |
| 2013/0155061 | A1 | 6/2013 | Jahanshahi et al. |

FOREIGN PATENT DOCUMENTS

| | | |
|---|---|---|
| WO | 0173476 A1 | 10/2001 |
| WO | WO2011042386 A1 | 4/2011 |
| WO | WO2011065169 A1 | 6/2011 |
| WO | WO2011069191 A1 | 6/2011 |

OTHER PUBLICATIONS

International Search Report and Written Opinion of the International Searching Authority (KIPO), dated Feb. 26, 2013, for PCT Application No. PCT/US2012/049796, entitled "Image-Based Crack Detection," filed Aug. 6, 2012, Jahanshahi et al., inventors, University of Southern California, applicant.

Chen, Z.Q. et al. 2010. Image-Based Framework for Concrete Surface Crack Monitoring and Quantification. Advances in Civil Engineering, vol. 2010, Article ID 215295, 18 pages [doi: 10.1155/2010/215295].

Hu, Y. et al. 2010. Automatic Pavement Crack Detection Using Texture and Shape Descriptors. IETE Technical Review [serial online] vol. 27, pp. 398-405 [available from http://tr.ietejournals.org/text.asp?2010/27/5/398/62225], published online Aug. 11, 2010.

Jain, A.K. et al. 1991. A K-Nearest Neighbor Artificial Neural Network Classifier. IJCNN-91 Seattle International Joint Conference on Neural Networks, Jul. 8-14, 1991, vol. II, pp. 515-520 [doi: 10.1109/IJCNN.1991.155387].

Sinha, S.K. et al. 2006. Neuro-Fuzzy Network for the Classification of Buried Pipe Defects. Automation in Construction, vol. 15, pp. 73-83.

Sinha, S.K. et al. 2006. Segmentation of Buried Concrete Pipe Images. Automation in Construction, vol. 15, pp. 47-57.

Office Action, dated Mar. 14, 2014 for U.S. Appl. No. 13/567,943, filed Aug. 6, 2012, entitled Image-Based Crack Detection, Jahanshahi et al., inventors.

Bray, J. et al. 2006. A Neural Network Based Technique for Automatic Classification of Road Cracks. Neural Networks, 2006. IJCNN '06: 2006 International Joint Conference on Neural Networks, Sheraton Vancouver Wall Centre Hotel, Vancouver, BC, Canada, Jul. 16-21, 2006, pp. 907-912.

Cafiso, S. et al. 2006. Evaluation of Pavement Surface Distress Using Digital Image Collection and Analysis. Proceedings of the Seventh International Congress on Advances in Civil Engineering, Oct. 11-13, 2006, Yildiz Technical University, Istanbul, Turkey, 10 pages.

Cord, A. et al. 2011. Automatic Road Defect Detection by Textural Pattern Recognition based on AdaBoost. Computer-Aided Civil and Infrastructure Engineering, 2011, pp. 1-16.

Fukuhara, T. et al. 1990. Automatic Pavement-Distress-Survey System. Journal of Transportation Engineering, vol. 116, No. 3, pp. 280-286.

Gavilan, M. et al. 2011. Adaptive Road Crack Detection System by Pavement Classification. Sensors, vol. 11, No. 10, pp. 9628-9657.

Hou, Z. et al. 2007. Experimentation of 3d pavement imaging through stereovision. International Conference on Transportation Engineering, 2007 (ICTE 2007), vol. 246. ASCE, pp. 376-381.

Koch, C. et al. 2011. Pothole Detection in Asphalt Pavement Images. Advanced Engineering Informatics, vol. 25, No. 3, pp. 507-515.

Lee, B. et al. 2004. Position-Invariant Neural Network for Digital Pavement Crack Analysis. Computer-Aided Civil and Infrastructure Engineering, vol. 19, No. 2, pp. 105-118.

Li, Q. et al. 2010. A Real-Time 3D Scanning System for Pavement Distortion Inspection. Measurement Science and Technology, vol. 21, No. 1, Article ID: 015702 (8 pp.).

Li, Q. et al. 2011. Pavement Crack Classification via Spatial Distribution Features. EURASIP Journal on Advances in Signal Processing, 2011, Article ID: 649675 (12 pp.).

Ma, C. et al. 2009. Pavement Cracks Detection Based on FDWT. Computational Intelligence and Software Engineering, 2009. CiSE 2009. International Conference on. 4 pp.

Nguyen, T.S. et al. 2009. Automatic Detection and Classification of Defect on Road Pavement Using Anisotropy Measure. In Proceedings of the 17th European Signal Processing Conference (EUSIPCO 2009), Glasgow, Scotland, Aug. 24-28, 2009 (EURASIP '2009), pp. 617-621.

Nguyen, T.S. et al. 2011. Free-Form Anisotropy: A New Method for Crack Detection on Pavement Surface Images. 18th IEEE International Conference on Image Processing, Brussels, Belgium, IEEE, pp. 1093-1096.

Salari, E. et al. 2011. Automated Pavement Distress Inspection Based on 2d and 3d Information. IEEE International Conference on Electro/Information Technology (EIT). 1-4.

Tanaka, N. et al. 1998. A Crack Detection Method in Road Surface Images Using Morphology. MVA'98, IAPR Workshop on Machine Vision Applications, Nov. 17-19, 1998, Makuhari, Chiba, Japan, pp. 154-157.

Ying, L. et al. 2009. Beamlet transform based technique for pavement image processing and classification, Electro/Information Technology, 2009. EIT '09. IEEE International Conference on , vol., No., pp. 141-145, Jun. 7-9, 2009.

Yu, X. et al. 2011. Pavement Pothole Detection and Severity Measurement Using Laser Imaging. IEEE International Conference on Electro/Information Technology (EIT), 5 pages.

Zhibiao, S. et al. 2010. Algorithm on Contourlet Domain in Detection of Road Cracks for Pavement Images. In Proceedings of the 2010 Ninth International Symposium on Distributed Computing and Applications to Business, Engineering and Science (DCABES), IEEE, pp. 518-522.

Zhou, J. et al. 2003. Wavelet-Based Pavement Distress Detection and Evaluation. Proceedings of SPIE, vol. 5207, pp. 728-739.

Zhou, J. et al. 2005. Wavelet-based pavement distress image compression and noise reduction. Proceedings of SPIE, vol. 5914. SPIE, Item No. 59141Zm, 11 pages.

International Search Report and Written Opinion of the International Searching Authority (KIPO), dated Apr. 25, 2013, for PCT Application PCT/US2012/069927, filed Dec. 14, 2012, entitled "Autonomous Pavement Condition Assessment."

Office Action, dated Oct. 8, 2014, for U.S. Appl. No. 13/717,244, filed Dec. 17, 2012, Mohammad R. Jahanshahi et al., inventors, entitled "Autonomous Pavement Condition Assessment."

International Search Report and Written Opinion of the International Searching Authority (KIPO), dated Jan. 3, 2012, for PCT Application No. PCT/US2012/049800, entitled "Image-Based Crack Quantification," filed Aug. 6, 2012, Jahanshahi et al., inventors, University of Southern California, applicant.

Fisher, R.A. 1936. The Use of Multiple Measurements in Taxonomic Problems, Annals of Eugenics, vol. 7, pp. 179-188.

Jahanshahi, M.R. et al. 2012. U.S. Appl. No. 13/567,943, filed Aug. 6, 2012, entitled Image-Based Crack Detection.

Lowe, D.G. 2004. Distinctive Image Features from Scale-Invariant Keypoints. International Journal of Computer Vision, vol. 60, pp. 91-110.

Otsu, N. 1979. A Threshold Selection Method from Gray-Level Histograms. IEEE Transactions on Systems, Man, and Cybernetics, pp. 62-66.

(56) References Cited

OTHER PUBLICATIONS

Salembier, P. 1990. Comparison of Some Morphological Segmentation Algorithms Based on Contrast Enhancement: Application to Automatic Defect Detection. Proceedings of the EUSIPCO-90, Fifth European Signal Processing Conference, pp. 833-836.

Snavely, K.N. 2008. Scene Reconstruction and Visualization from Internet Photo Collections, Ph.D. Thesis, University of Washington, Seattle.

Final Office Action, dated Apr. 20, 2015, for U.S. Appl. No. 13/717,244, filed Dec. 17, 2012, Mohammad R. Jahanshahi et al., inventors, entitled "Autonomous Pavement Condition Assessment."

* cited by examiner (a)  (b)

FIG. 7

IMAGE-BASED CRACK QUANTIFICATION

RELATED APPLICATIONS

This application claims the benefit of and priority to U.S. Provisional Patent Application No. 61/515,040, filed 4 Aug. 2011, and entitled "Contactless Vision-Based Crack Thickness Quantification by Incorporating Depth Perception"; U.S. Provisional Patent Application No. 61/515,024, filed 4 Aug. 2011, and entitled "Adaptive Vision-Based Crack Detection by Incorporating Depth Perception"; and, U.S. Provisional Patent Application No. 61/515,022, filed 4 Aug. 2011, and entitled "Multi-Image Stitching and Scene Reconstruction for Assessment of System Conditions"; the entire contents of all of which applications are incorporated by reference herein.

STATEMENT REGARDING FEDERALLY SPONSORED RESEARCH

This invention was made with government support under Grant No. CNS-032875, awarded by the National Science Foundation (NSF). The Government has certain rights in the invention.

BACKGROUND

1. Technical Field

This disclosure relates to image processing and pattern cognition in general, and in particular to image-based crack detection and quantification.

2. Description Of Related Art

Visual inspection of structures is a highly qualitative method in which inspectors visually assess a structure's condition. If a region is inaccessible, typically, optical devices such as binoculars must be used to detect and characterize defects. Although several Non-Destructive Testing (NDT) methods have been proposed for inspection purposes, they are nonadaptive and cannot quantify crack thickness reliably.

SUMMARY

Illustrative embodiments are now discussed and illustrated. Other embodiments may be used in addition or instead. Details which may be apparent or unnecessary may be omitted to save space or for a more effective presentation. Conversely, some embodiments may be practiced without all of the details which are disclosed.

In general terms, the present invention provides contactless remote-sensing crack detection and/or quantification methodologies that are based on three-dimensional (3D) scene reconstruction, image processing, and pattern recognition. Systems and methodologies according to the invention can utilize depth perception for detecting and/or quantifying cracks. These methodologies can provide the ability to analyze images captured from any distance and using any focal length or resolution. This unique adaptive feature may be especially useful for incorporation into mobile systems, such as unmanned aerial vehicles (UAV) or mobile autonomous or semi-autonomous robotic systems such as wheel-based or track-based radio controlled robots, as utilizing such structural inspection methods onto those mobile platforms may allow inaccessible regions to be properly inspected for cracks. In exemplary applications, crack detection and/or quantification as described in the present disclosure, can be used for concrete structures such as buildings, damns, bridges, and/or nuclear reactors, and the like.

In one aspect, the present invention provides contactless methods of detecting cracks, such as those observed in concrete structures.

In a further aspect, the present invention provides contactless crack quantification methodologies for determining or quantifying the thickness of detected cracks.

In exemplary embodiments, the approaches may be incorporated with autonomous or semi-autonomous robotic systems.

BRIEF DESCRIPTION OF THE DRAWINGS

The drawings are of illustrative embodiments. They do not illustrate all embodiments. Other embodiments may be used in addition or instead. Details that may be apparent or unnecessary may be omitted to save space or for more effective illustration. Some embodiments may be practiced with additional components or steps and/or without all of the components or steps that are illustrated. When the same numeral appears in different drawings, it refers to the same or like components or steps.

FIG. 7 depicts a collection of crack orientation kernels, in accordance with an embodiment of the invention.

DETAILED DESCRIPTION

Illustrative embodiments are now described. Other embodiments may be used in addition or instead. Details that may be apparent or unnecessary may be omitted to save space or for a more effective presentation. Some embodiments may be practiced with additional components or steps and/or without all of the components or steps that are described.

In general terms, the present invention provides contactless remote-sensing crack detection and/or quantification methodologies that are based on three-dimensional (3D) scene reconstruction, image processing, and pattern recognition. Systems and methodologies according to the invention can utilize depth perception for detecting and/or quantifying cracks. These methodologies can provide the ability to analyze images captured from any distance and using any focal length or resolution. This unique adaptive feature may be especially useful for incorporation into mobile systems, such as unmanned aerial vehicles (UAV) or mobile autonomous or semi-autonomous robotic systems such as wheel-based or track-based radio controlled robots, as utilizing such structural inspection methods onto those mobile platforms may allow inaccessible regions to be properly inspected for cracks. In exemplary applications, crack detection and/or quantification as described in the present disclosure, can be used for concrete structures such as buildings, damns, bridges, and/or nuclear reactors, and the like.

In one aspect, the present invention provides contactless methods of detecting cracks, such as those observed in concrete structures.

In a further aspect, the present invention provides contactless crack quantification methodologies for determining or quantifying the thickness of detected cracks.

In exemplary embodiments, the approaches may be incorporated with autonomous or semi-autonomous robotic systems.

Figure 1:
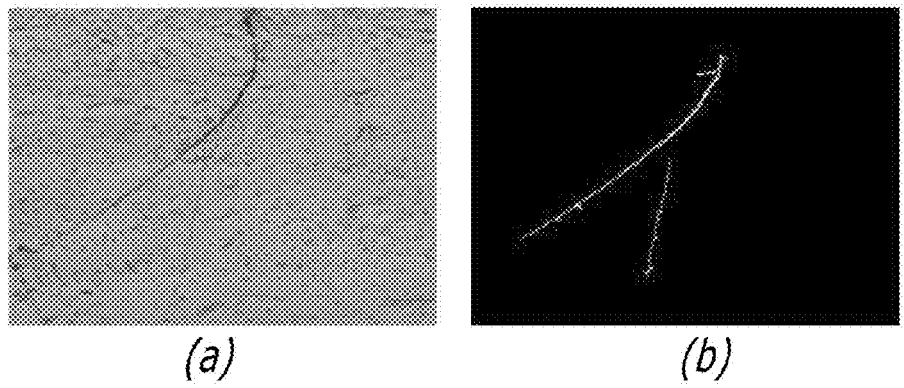
FIG. 1 shows a pair of juxtaposed images: (a) a picture of a crack in concrete, and (b) segmented crack pixels derived from the picture, in accordance with the invention.

For crack detection and quantification methods in accordance with the invention, one or more cracks is/are segmented from the related background. For example, FIG. 1 shows a pair of juxtaposed images: (a) a picture of a crack in concrete, and (b) segmented crack pixels derived from the picture, in accordance with the invention. The white pixels in FIG. 1(b) are the extracted crack pixels.

One aspect of the present invention involves crack detection. Various embodiments of the present invention can receive image data and from such date produce a crack map, depicting one or more detected cracks.

Figure 2:
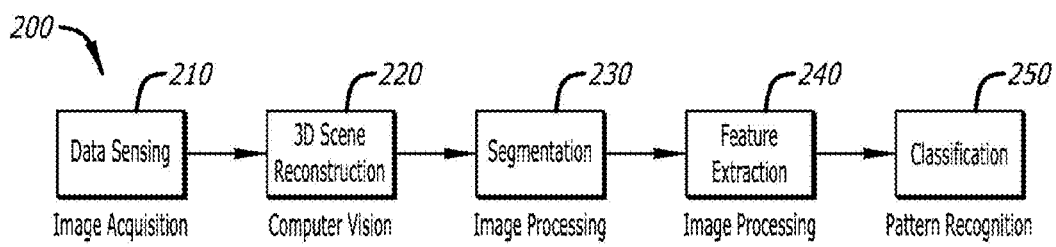
FIG. 2 shows a high-level scheme for crack detection, in accordance with exemplary embodiments of the invention.

FIG. 2 shows a high-level scheme for a crack detection system/method 200, in accordance with exemplary embodiments of the invention. First, several pictures of a scene (having one or more cracks visible in a structure or feature) are captured from different views, as indicated by "data sensing" at 210. Next, a three-dimensional (3D) sparse model of the scene is reconstructed, e.g., by solving the structure-from-motion (SfM) problem for the scene, as shown at 220. See, e.g., K. N. Snavely, "Scene Reconstruction and Visualization from Internet Photo Collections, Ph.D. thesis, University of Washington, Seattle, Wash. USA (2008). By solving the SfM problem set up for the scenario, the sparse structure of a scene as well as the camera's position, orientation, and internal parameters for each view are determined. By scaling the reconstructed sparse 3D model of a scene, the depth perception is obtained. Subsequently, a morphological crack segmentation operator can be used to segment the whole crack, as shown at 230. For this operator, a structuring element parameter can be automatically adjusted based on the camera focal length, object-camera distance, camera resolution, camera sensor size, and the desired crack thickness. Appropriate features may be extracted and selected for each segmented pattern, as indicated at 240, e.g., using the Linear Discriminant Analysis approach. See, e.g., R. A. Fisher, "The Use of Multiple Measurements in Taxonomic Problems, Annals of Eugenics 7, pp. 179-188 (1936). As shown at 250, one or more classifiers (or trained classifiers) can be used to classify real cracks. Suitable classifiers can include but are not limited to a trained neural network (NN), a support vector machine (SVM), and/or a nearest-neighbor classifier. A multiscale approach can then be introduced to obtain a resulting crack map. Detection system/method 200 is adaptive because, based on the image acquisition specifications, camera-object distance, focal length, and image resolution, parameters are adjusted to detect cracks of interest.

Crack detection and/or quantification according to the present invention can utilize depth perception. For such depth perception, it can be useful in exemplary embodiments for the three-dimensional (3D) structure of a scene to be constructed or recovered, e.g., from multiple images of the scene. From such a 3D structure of a scene, the geometric relation between image acquisition system parameters and imaged object(s) can be obtained. Alternatively, the geometric relation between image acquisition parameters (e.g., working distance from camera to object, focal length, etc.) and imaged object(s) can be done by other suitable means, e.g., with manual or user-obtained measurements such as with a laser range-finder or other measuring apparatus such as measuring tape.

Figure 3:
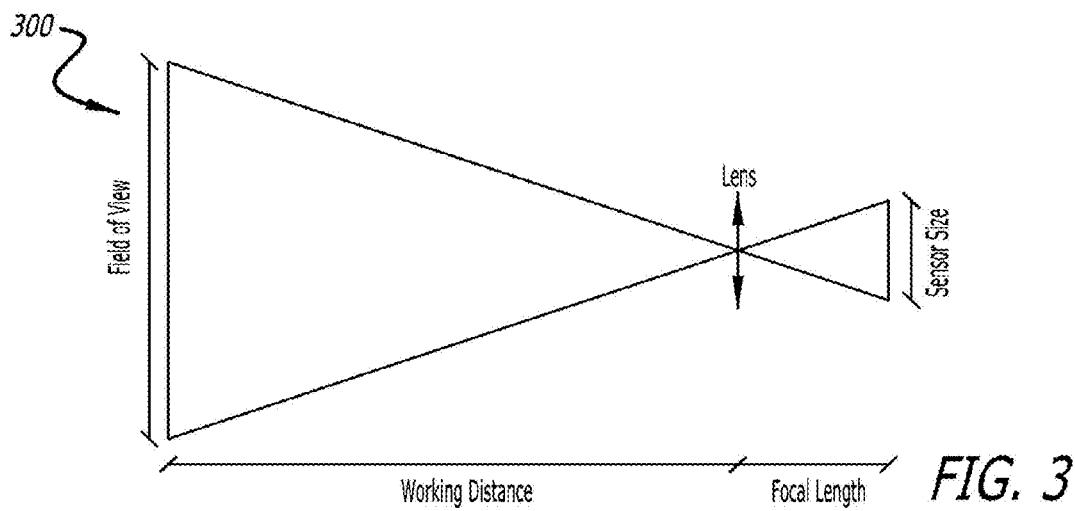
FIG. 3 illustrates the geometric relation between image acquisition parameters of a simple pinhole camera model, as used in accordance with invention.

FIG. 3 illustrates the geometric relation between image acquisition parameters of a simple pinhole camera model 300, as used in accordance with invention.

Using the simple pinhole camera model 300 shown in FIG. 3 the relation between different image acquisition parameters is shown in the following:

$$SF = \left(\frac{WD}{FL}\right)\left(\frac{SS}{SR}\right)n, \quad (EQ. 1)$$

where SF (mm) is the size of a pattern (e.g., crack thickness) represented by n pixels in an image, WD (mm) is the working distance (camera-object distance), FL (mm) is the camera focal length, SS (mm) is the camera sensor size, and SR (pixels) is the camera sensor resolution. The camera sensor size can be obtained from the manufacturer and the camera sensor resolution is known from the image size. The measurements for the working distance, and the camera focal length are used to quantify an n-pixels feature. These two parameters can by estimated as described below, for exemplary embodiments. Other suitable parameter estimation techniques may of course be utilized.

For some applications, in order to obtain good or optical crack quantification results, based on experiment, it may be desirable to select the image acquisition system parameters in a way that the thickness of the thinnest crack would be represented by six pixels or more in an image.

Scene Reconstruction—Exemplary Embodiments

Figure 4:
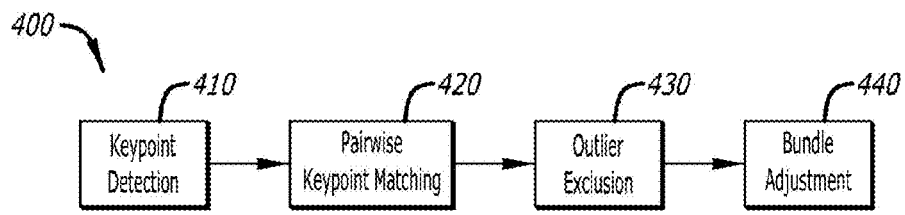
FIG. 4 shows a schematic overview and components of the Structure from Motion (SfM) problem, as used in accordance with the present disclosure.

To create depth perception from a collections of images, the 3D structure of a scene can be recovered. For this approach, first, several overlapping images of the object are captured from different views. The SfM approach aims to optimize a 3D sparse point cloud and viewing parameters simultaneously from a set of geometrically matched key points taken from multiple views. FIG. 4 shows a schematic overview of the SfM problem 400.

In the SfM problem/system 400, scale-invariant feature transform (SIFT) are detected in each image (410) and then matched between all pair of images (420). See D. G. Lowe, "Distinctive Image Features from Scale-Invariant Keypoints," Int'l J. Computer Vision 60, pp. 91-110 (2004). The random sample consensus (RANSAC) algorithm can be used, in some applications, to exclude outliers (430). Other suitable algorithms may be used instead of or in addition to the RANSAC algorithm. These matches can be used to recover focal length, camera center and orientation; and also radial lens distortion parameters (two parameters corresponding to a 4th order radial distortion model can be estimated) for each view, as well as the 3D structure of a scene. This optimization process is referred to herein as bundle adjustment (440).

Since measuring the camera-object distance is not always an easy or practical task, the reconstructed 3D cloud and camera locations from the SfM problem are used to estimate the working distance; however, the SaI problem estimates the relative 3D point coordinates and camera locations. By knowing how much the camera center has moved between just two of the views, the reconstructed 3D points and camera locations can be scaled. To obtain the absolute camera-object distance, a plane is fitted to the 3D points seen in the view of interest. This can be done by using the RANSAC algorithm to exclude the outlier points. By retrieving the equation of the fitted plane, one can find the intersection between the camera orientation line passing through the camera center and the fitted plane. The distance between this intersection point and the camera center is computed as the working distance.

Furthermore, the estimated focal lengths from the SfM problem are in pixels. To scale these quantities, the estimated focal length for each view is scaled by the ratio of the sensor size to the sensor resolution. This means that EQ. 1 can be simplified to:

$$SF = \left(\frac{WD}{FL}\right)n, \qquad (EQ. 2)$$

Where FL is in pixels.

Note that if scene reconstruction is impossible (e.g., not enough views are available), the approximate focal length can be extracted from the image Exchangeable Image File Format (EXIF) file. In this case, EQ. 1 can be used to estimate the interaction of the image acquisition parameters provided that the working distance is given.

Embodiments above are described as utilizing the SfM problem to derive a reconstructed 3D structure to obtain image acquisition parameters or geometry of a scene; as was noted previously, however, the geometric relation between image acquisition parameters (e.g., working distance from camera to object, focal length, etc.) and imaged object(s) can be obtained by other suitable means, e.g., with manual or user-obtained measurements such as with a laser range-finder or other measuring apparatus such as measuring tape. Thus, these other methods and their equivalents may be used with crack detection and/or crack quantification according to the present invention.

Crack Detection

Crack detection methodologies according to the present invention may utilize the scene reconstruction approach described previously. The main elements of the proposed crack detection procedure are segmentation, feature extraction, and decision making. Note that before processing any image, it is preferably undistorted using the distortion coefficients obtained from the SfM problem.

Segmentation

Segmentation is a set of steps that isolate the patterns that can be potentially classified as a, defined defect. The aim of segmentation is to reduce extraneous data about patterns whose classes are not desired to be known. Several segmentation techniques have been evaluated by the inventors, and it has been concluded that a proposed morphological operation by Salembier as modified and described herein works best for crack detection purposes in components that are typically encountered in civil infrastructure systems.

Morphological Operation

Morphological image processing, which is based on mathematical morphology, is used to extract useful information about the scene objects. The foundation of morphological image processing is based on previous studies by Minkowski and Metheron on set algebra and topology, respectively.

The morphological operation by Salembier is modified here to enhance its capability for crack extraction in different orientations. See Salembier, P., "Comparison of Some Morphological Segmentation Algorithms Based on Contrast Enhancement: Application to Automatic Defect Detection," Proceedings of the EUSIPCO-90, Fifth European Signal Processing Conference, pp. 833-836 (1990). The morphological operation used for exemplary embodiment of the subject technology is shown in EQ. 3 as follows:

$$T = \max\lfloor (I \circ S_{\{0°,45°,90°,135°\}}) \bullet S_{\{0°,45°,90°,135°\}}, I \rfloor - I, \qquad (EQ. 3)$$

where I the grayscale image, S is the structuring element that defines which neighboring pixels are included in the operation, '$\circ$' is the morphological opening, and '$\bullet$' is the morphological closing. The output image T is then binarized, e.g., using Otsu's thresholding method or other suitable binarization schemes, to segment potential crack-like dark regions from the rest of the image. See Otsu, N., "A Threshold Selection Method from Gray-Level Histograms," IEEE Trans. On Systems, Man, and Cybernetics, pp. 62-66 (1979). This nonlinear filter extracts the whole crack as opposed to edge detection approaches where just the edges are segmented.

Furthermore, small extracted patterns can be eliminated as noise. For this purpose, if the length of a segmented pattern is less than a, minimum length, specified by the user, that pattern is eliminated In order to convert minimum length of interest in unit length to minimum length in pixels, (4) is used:

$$l_p = \left(\frac{FL}{WD}\right)l, \qquad (EQ. 4)$$

where l is the defined length by the user in unit length, FL and WD (obtained from SfM and scaling, as described in Section 3) are in pixels and unit length, respectively, and $l_p$ is the length in pixels.

Structuring Element

By choosing the size and shape of the structuring element (i.e., neighborhood), a filter that is sensitive to a specific shape can be constructed. When the structuring element has a line format, it can segment cracks that are perpendicular to it. If the length of the structuring element (in pixels) exceeds the thickness of a dark object in an image, then this object can be segmented by the operation in EQ. 3. Consequently, in exemplary embodiments, linear structuring elements are defined in 0°, 45°, 90°, and 135° orientations.

Figure 5:
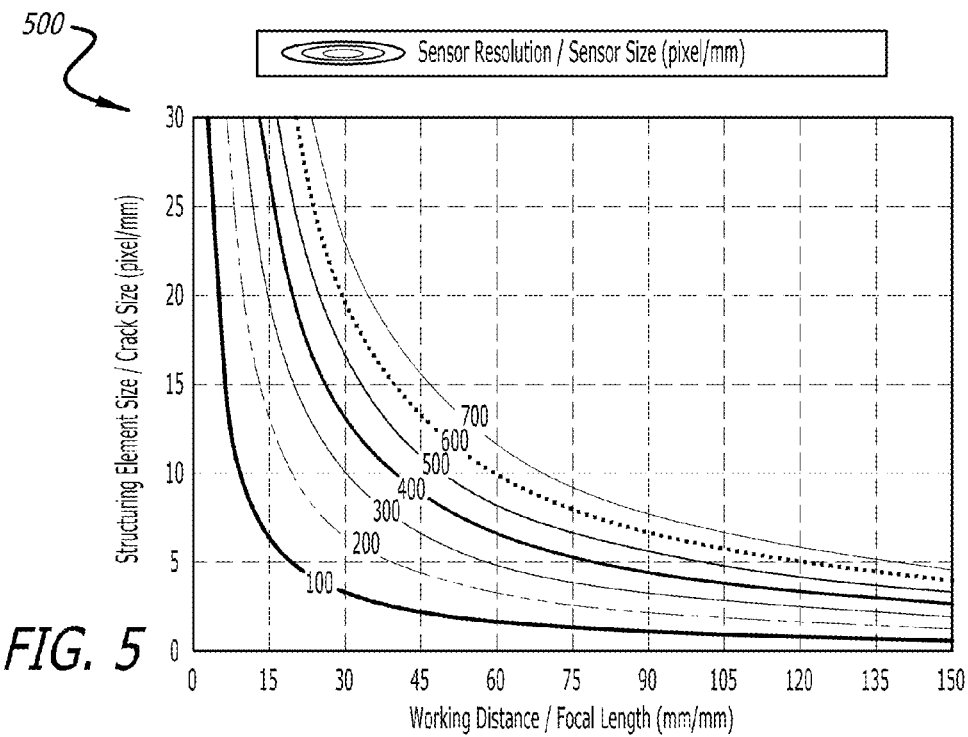
FIG. 5 is graph showing the relationship between structuring element size, camera focal length, working distance, crack size, camera sensor size, and camera sensor resolution for a simple camera model, in accordance with the present disclosure.

The challenge is to find the appropriate size for the structuring element. By having the scaled working distance, the derived formula in EQ. 1 can be used to compute the appropriate structuring element. Using this equation, the size of the appropriate structuring element can be computed based on the crack size of interest (where n is the structuring element size). FIG. 5 shows the relationship between these parameters and can be used to determine appropriate image acquisition system parameters.

Feature Extraction

After segmenting the patterns of interest, they can be assigned a set of finite values representing quantitative attributes or properties called features. These features should represent the important, characteristics that help identify similar patterns. To determine discriminative features useful for classification purposes, the inventors initially defined and analyzed twenty nine features. Eleven of these features were selected as potentially appropriate features for further analysis. Using the LDA approach, the following five features were found to be discriminately appropriate (i.e., preserving 99.4% of the cumulative feature ranking criteria) for classification: (1) eccentricity (a scalar that specifies the eccentricity of the ellipse that has the same second-moments as the segmented object), (2) area of the segmented object divided by the area of the above ellipse, (3) solidity (a scalar specifying the proportion of pixels in the convex hull that also belong to the segmented object), (4) absolute value of the correlation coefficient (here, correlation is defined as the relationship between the horizontal and vertical pixel coordinates), and (5) compactness (the ratio between the square root of the extracted area and its perimeter). The convex hull for a segmented object can be defined as the smallest convex polygon that can contain the object. The above features were computed for each segmented pattern under examination.

Classification

To evaluate methodologies of crack detection, a feature set consisting of 1,910 non-crack feature vectors and 3,961 synthetic crack feature vectors was generated to train and evaluate the classifiers. About 60% of this set was used for training, while the remaining feature vectors were used for validation and testing. Note that due to the lack of access to a large number of real cracks, randomized synthetic cracks were generated to augment the training database. For this reason, real cracks were manually segmented and an algorithm was developed to randomly generate cracks from them. The non-crack feature vectors were extracted from actual scenes. The performance of several SVM and NN classifiers was evaluated. Eventually, a SVM with a 3rd order polynomial kernel and a 3-layer feed-forward NN with 10 neurons in the hidden layer and 2 output neurons were used for classification. A nearest-neighbor classifier was used to evaluate the performance of the above classifiers.

Performances of these three classifiers were analyzed, with the analysis showing that the SVM and NN approaches have very close performances, which were better than a nearest-neighbor classifier.

Note that the SVM method is a discrete classifier, whereas the NN approaches typically needs a threshold to act as a discrete classifier. In an implemented embodiment, if the value of the crack output neuron was found to be greater than the value of the non-crack neuron, the pattern was classified as a crack, otherwise, as a non-crack. This is identical to set the threshold equal to 0.5.

Figure 6:
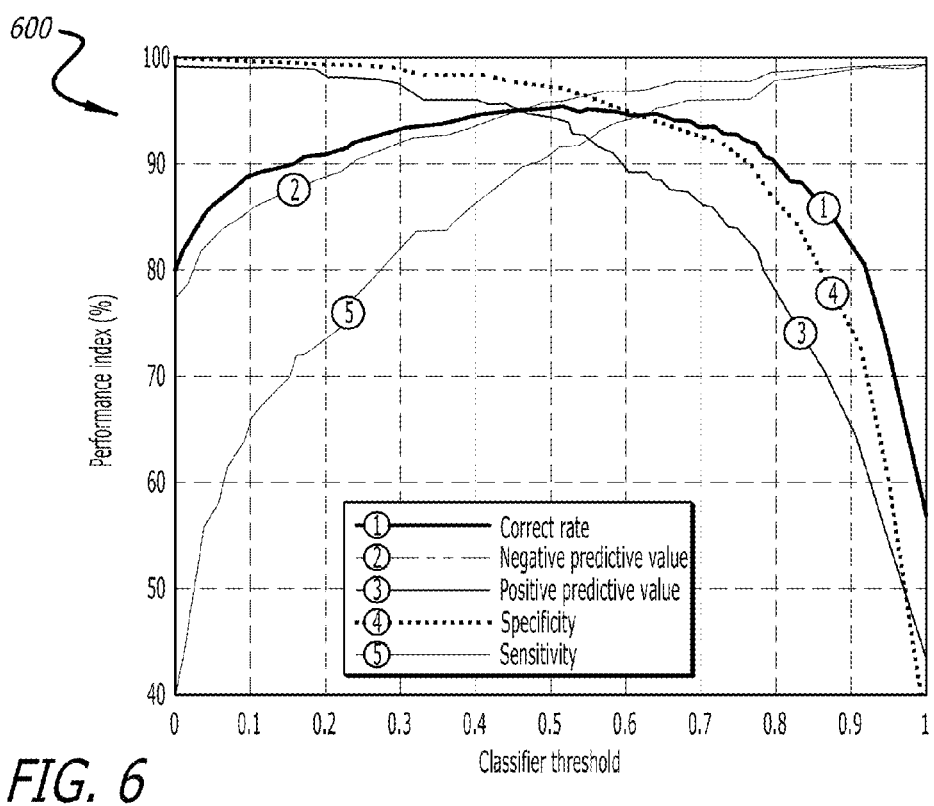
FIG. 6 is a graph showing the effect of decision making threshold on different performance indices for a neural network classifier, according to an embodiment of the invention.

FIG. 6 shows the effect of changing the decision making threshold on different performance indices for the specific NN used for an implemented embodiment. In the figure, 'positive predictive value' is the proportion of the correctly classified positives (i.e., cracks), and 'negative predictive value' is the proportion of the correctly classified negatives (i.e., non-cracks). For applications where it is expensive to miss a crack (e.g., inspection purposes), it is recommended to select a more conservative threshold (i.e., a threshold less than 0.5). As a threshold moves toward zero, specificity and positive predictive rates increase while sensitivity and negative predictive rates decrease. This means there will be more false negatives and less false positives. For less sensitive applications, one may select a threshold greater than 0.5. Moreover, FIG. 6 helps decide about the appropriate threshold for a specific application by considering the performance indices. It is worth noting that if the training set, size is infinite, the outputs of the above back-propagation NN can converge to the true a posteriori probabilities].

Multi-Scale Crack Map

In order to obtain a crack map, the crack detection procedure described above was repeated using different structuring elements (i.e., different scales). Note that the extracted multi-scale binary crack map is the union of the detected cracks using different, structuring elements. The proposed crack map can be formulated as:

$$J^m(u,v)=\{1, \exists k \epsilon [S_{min}, m]; C^k(u,v)=1, \text{ and } 0 \text{ otherwise}; \quad \text{(EQ. 5)}$$

where $J^m$ is the crack map at scale (i.e., structuring element) m, $S_{min}$, is the minimum structuring element size, $C^k$ is the binary crack image obtained by using k as the structuring element, and u and v are the pixel coordinates of the crack map image.

In an implemented embodiment, the structuring elements of $\lceil n_{min} \rceil+2$ to $\lceil n_{max} \rceil+10$ were used for generating the crack map where $\lceil \ \rceil$ is the ceiling function, and $n_{min}$ and $n_{max}$ are the structuring element sizes corresponding to the minimum and maximum crack size of interest, respectively. The crack map was can be used for crack localization as well as quantification. Of course while the crack detection methodologies according to the subject technology may be used in conjunction with crack quantification methodologies according to the subject technology, these detection methods may be used with other crack quantification methodologies.

Crack Quantification

A further aspect of the present invention (or subject technology) includes methodologies (which term includes reference to systems and methods) for crack quantification.

Utilizing an crack map (one that includes a segmented crack), crack quantification methods of the invention calculate a crack thickness in pixels, along the crack, and then provide for scaling the computed thickness to a unit length.

Figure 7:
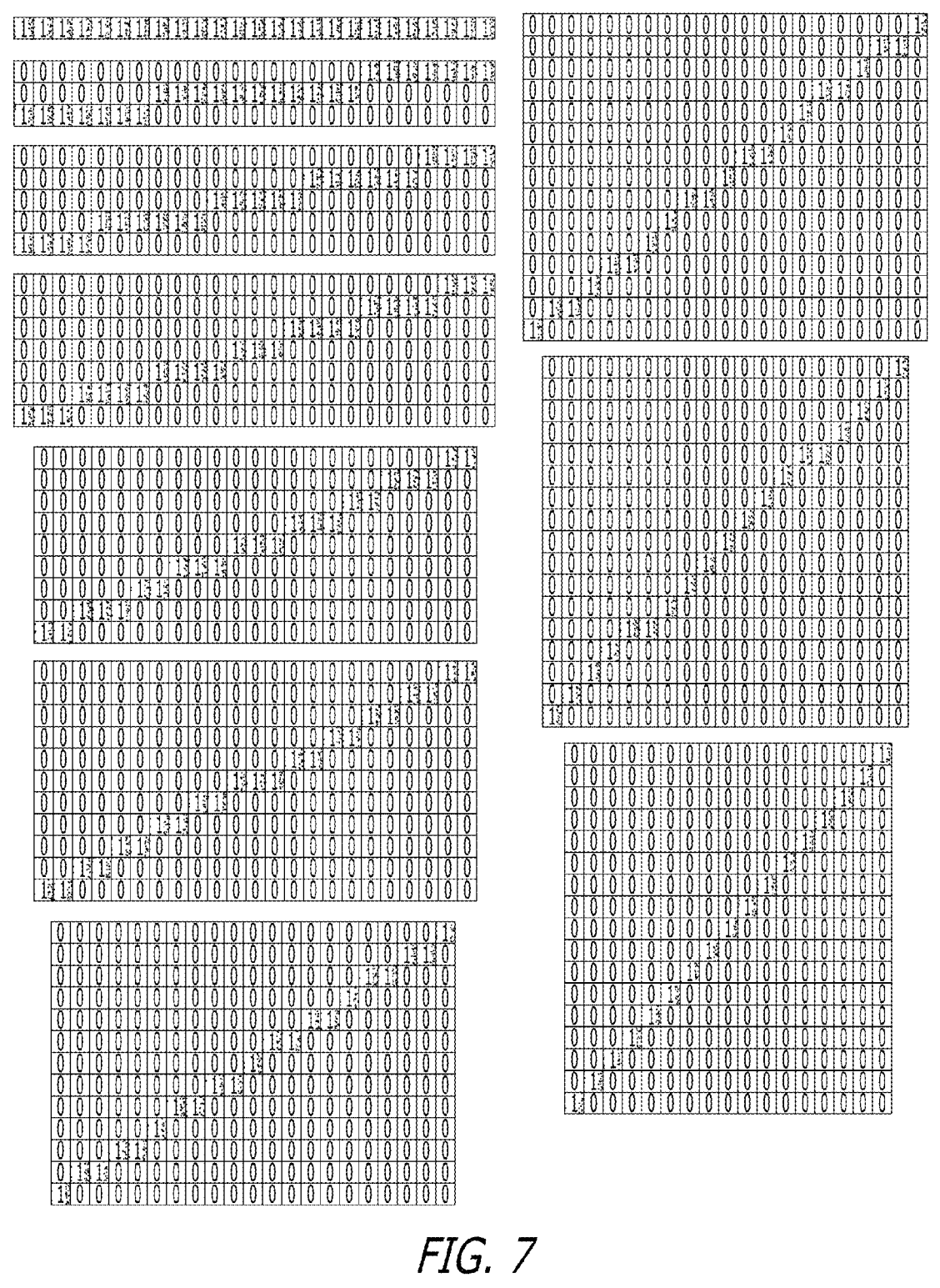
Figure 8:
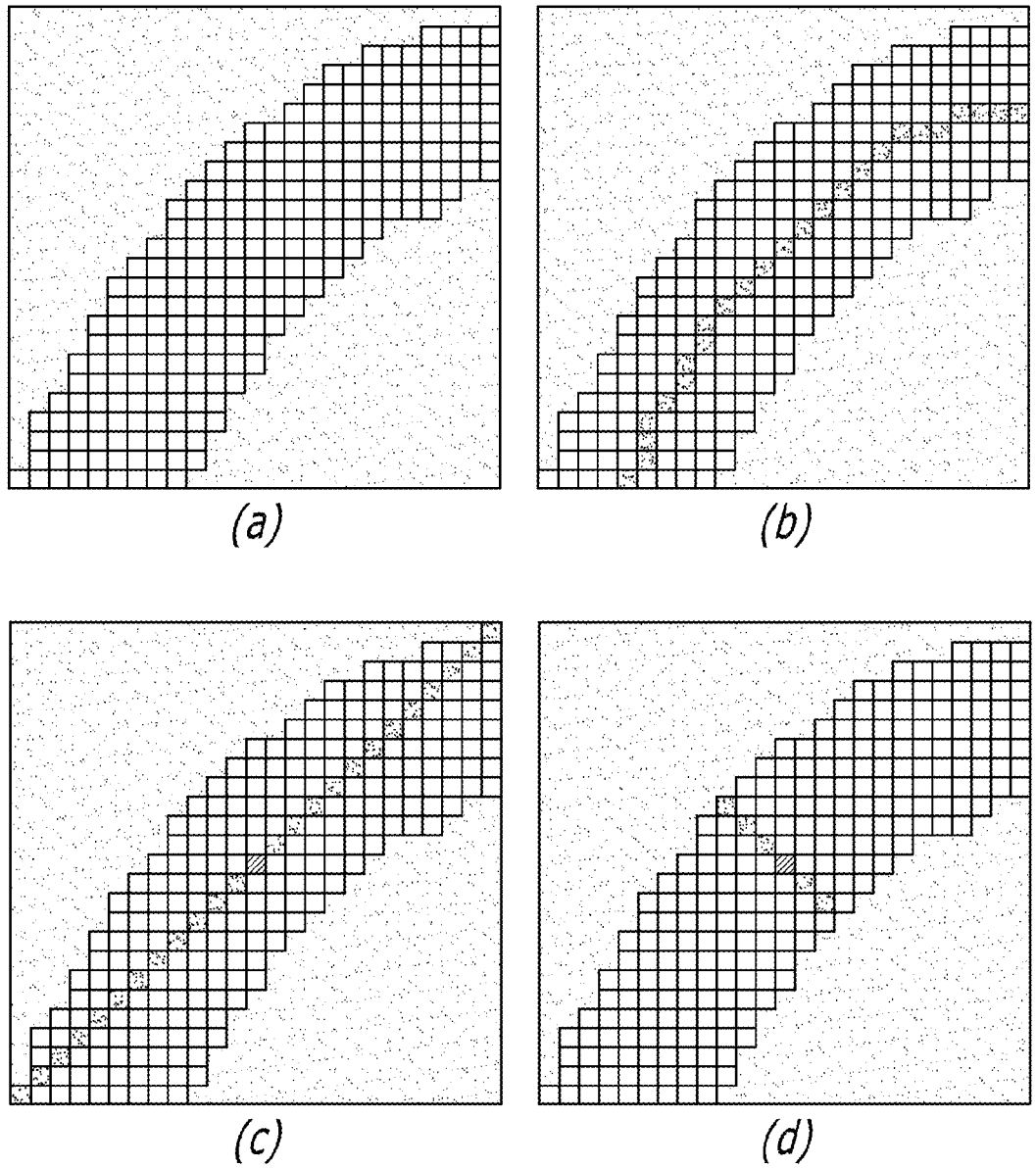
FIG. 8 depicts an example of crack thickness quantification, in accordance with an embodiment of the invention.

FIG. 7-8 illustrate details of an embodiment of crack quantification according to the invention. FIG. 7 depicts a collection of crack orientation kernels while FIG. 8 depicts an example of crack thickness quantification using the kernels of FIG. 7.

Referring now to FIGS. 7-8, a segmented crack can be thinned using morphological thinning, e.g. in accordance with an embodiment of the subject technology. The remaining pixels can be considered as the centerlines of the cracks. In order to measure a crack thickness, the perpendicular orientation to the crack pattern at each centerline pixel is identified. To reach this goal, the thinned segmented crack can be correlated with a set of collection of orientational kernels. In an exemplary embodiment, 35 kernels are used, where these kernels represent equally-incremented orientations from 0° to 175°. FIG. 7 shows the kernels from 0° to 45°; other kernels can be constructed based on these kernels.

For each centerline pixel, the kernel corresponding to the maximum correlation value represents the tangential orientation of the centerline. Thickness orientation was then defined as the perpendicular orientation to the detected tangential direction. Next, for each centerline pixel, the pixels in the original segmented crack that are aligned with the corresponding thickness orientation were counted in the horizontal and vertical directions. Using these two values, the hypotenuse was computed and considered to be the crack thickness in pixels. Finally, the crack thickness was converted to a unit length by knowing the camera-object distance and the focal length of the camera.

The white squares shown in FIG. 8 are crack pixels of a larger crack image, as shown in FIG. 8(a). Such a crack image may be provided or derived from any suitable methodology e.g., such as one resulting from a crack map output from any of the systems or methods described previously for FIGS. 1-6; other methodologies may of course be used. The shaded squares in FIG. 8(b) represent the centerline obtained by thinning the crack object. The kernel corresponding to 45°, centered at the dark center square, has the highest correlation with the thinned pixels, as shown in FIG. 8.(c). Consequently, the shaded squares in-line with the center dark square as shown in FIG. 8(d), which correspond to 135° direction, indicate the thickness orientation at the center square. As shown in FIG. 8, the number of the thickness pixels in the horizontal and vertical directions are both six (6) pixels, and the crack thickness at the center square is estimated as 8.5 pixels (as the square root of the sum of the squares).

Figure 9:
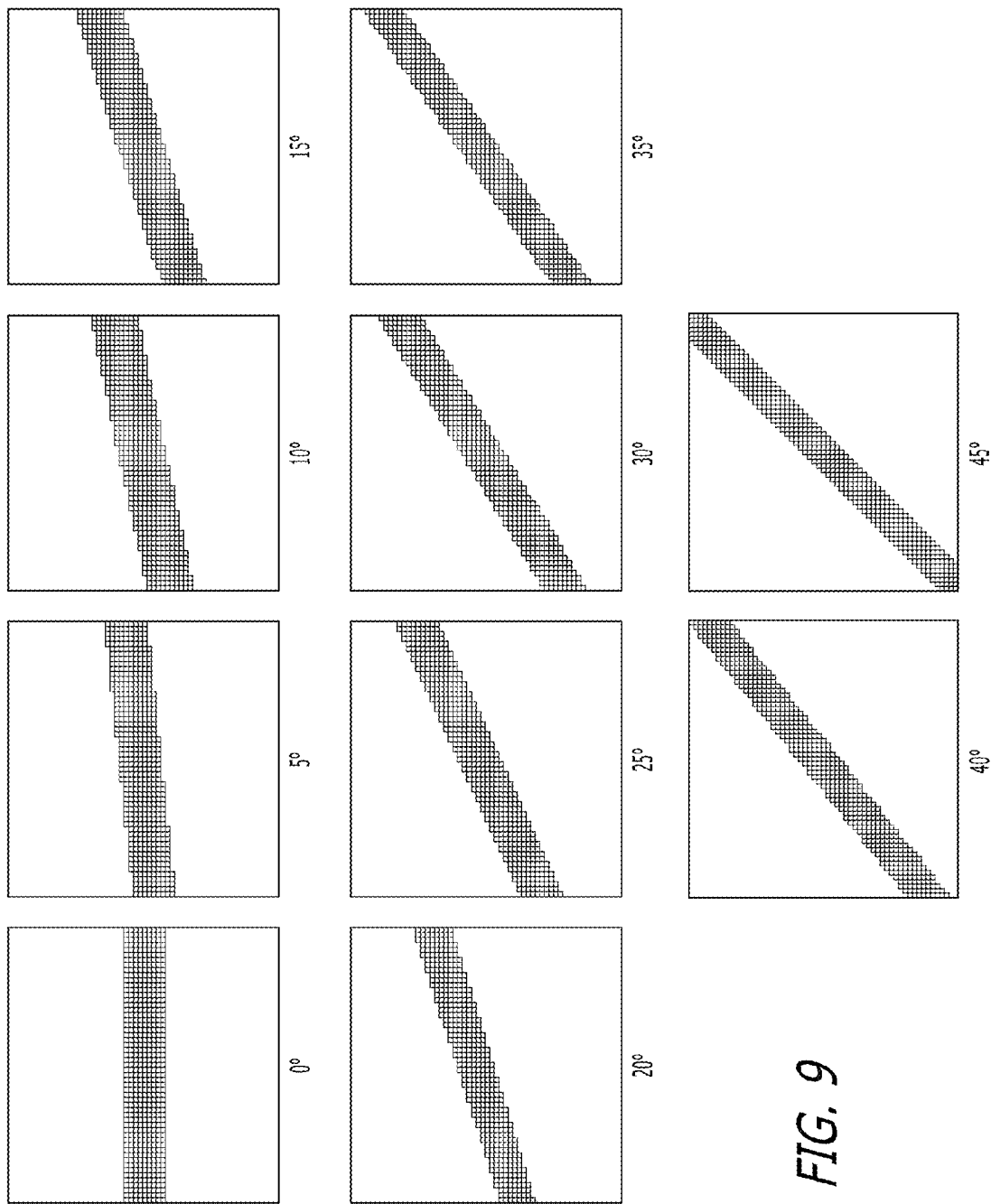
FIG. 9 depicts a collection of crack orientation kernels, in accordance with an exemplary embodiment of the invention.
Figure 10:
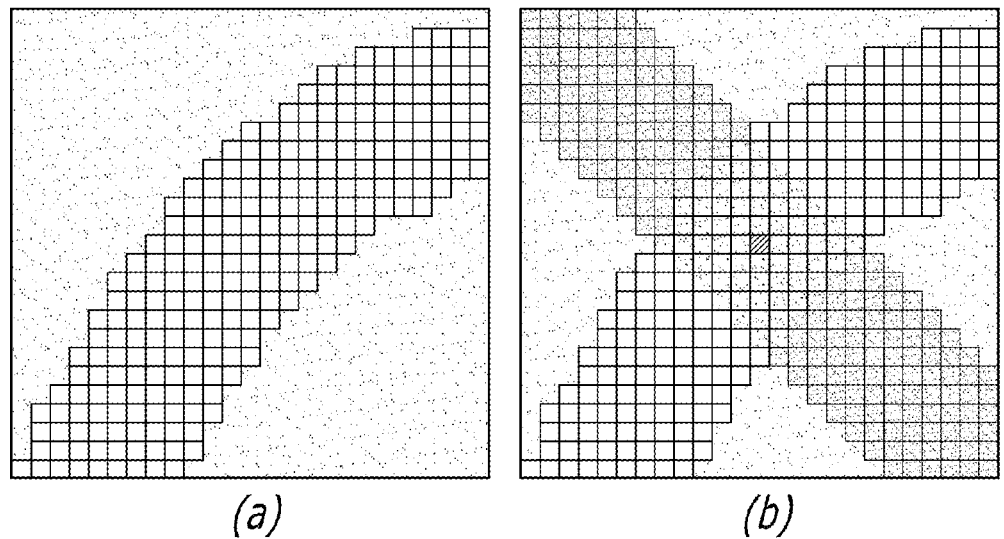
FIG. 10 depicts an example of crack thickness quantification, in accordance with an exemplary embodiment of the invention: in (a) the white squares are crack pixels of a larger crack image; (b) shows a strip kernel, 135°, corresponding to the minimum correlation value for a centerline pixel.

FIG. 9-10 illustrate details of an exemplary embodiment of crack quantification according to the invention. FIG. 9 depicts a collection of crack orientation kernels useful for the embodiment while FIG. 10 depicts an example of crack thickness quantification, in accordance with an exemplary embodiment of the invention: in (a) the white squares are crack pixels of a larger crack image; (b) shows a strip kernel, 135°, corresponding to the minimum correlation value for a centerline pixel.

Referring now to FIGS. 9-10, in accordance with an exemplary embodiment of crack quantification, a segmented crack can be correlated with a number of kernels, e.g., as described previously using 35 kernels, where these kernels represent equally-incremented strips from 0° to 175°. FIG. 9 shows the strip kernels from 0° to 45°, where the size of these kernels is 71×71 pixels. As shown in FIG. 9, for 0° to 45° and 135° to 175° kernels, eleven orientational kernels can be arranged vertically to form the strip kernels, where each column consists of eleven non-zero values. For 50° to 130° kernels, the orientational kernels may be arranged horizontally.

For each centerline pixel, obtained from morphological thinning, the strip kernel corresponding to the minimum correlation value represents the thickness orientation. Each correlation value is the area of the crack that is bounded between the strip edges. Since an eleven-pixel length is relatively small (along specified vertical or horizontal direction in the drawing), the crack thickness does not dramatically change in such a small region, and consequently the areas bounded by the strips can all be assumed to be trapezoids. Furthermore, the minimum correlation value corresponds to the area of the trapezoid that is approximately a rectangle. The length of this rectangle is the projection of the eleven-pixel length on the line which is perpendicular to the thickness orientation (i.e., the tangent at the centerline pixel). Finally, the crack thickness at each centerline pixel can be estimated by dividing the corresponding minimum correlation value by this length.

FIG. 10 shows an example of the thickness quantification method described above for FIG. 9. In FIG. 10(a), the white squares are crack pixels of a larger crack image, which may be supplied by embodiments according to the present invention or other techniques. The shaded squares, shown in FIG. 10(b), represent the strip kernel, centered at the dark center square, that has the minimum correlation value at the centerline pixel. The kernel orientation in this example is 135°. For a particular centerline pixel, the number of squares (66 for the example shown) within the strip kernel with the lowest correlation value and also within crack edges (see dashed lines in the figure) represents the correlation value. Consequently, the thickness for the indicated centerline pixel is 66/(11×cos 45°) 8.5 pixels. This thickness can be scaled to obtain the thickness in unit length.

Perspective Error

Figure 11:
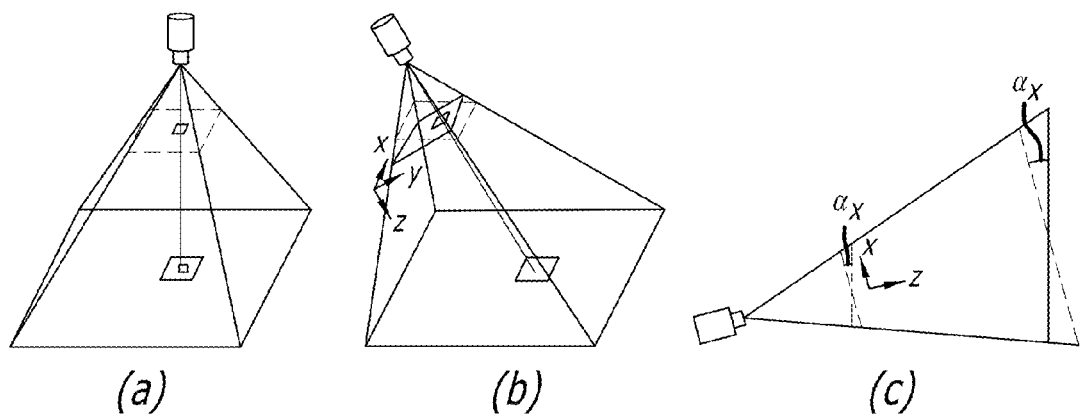
FIG. 11 shows three views (a)-(c) illustrating the effect of perspective error for imaging.

The previously-described methodologies are valid if the camera orientation is perpendicular to the plane of the object under inspection. If this plane is not perpendicular to the camera orientation (i.e., the projection surface and the object plane are not parallel), a perspective error will occur. FIG. 11 shows three views (a)-(c) illustrating the effect of perspective error for imaging.

In order to overcome the perspective error, the camera orientation vector and the normal vector of the object plane are needed. The camera orientation vector can be retrieved using SfM (as described above), and the normal plane can be computed by fitting a plane to the reconstructed 3D points, seen in the corresponding view, by excluding outliers using the RANSAC algorithm. For each centerline pixel, the number of pixels that are aligned with the corresponding thickness orientation can be counted in the horizontal and/or vertical directions. Next, the perspective error compensation for each component can be computed as:

$$\lambda'_x = \frac{\lambda_x}{\cos\alpha_x}, \qquad (EQ. 6)$$

where $\lambda_x$ is the perspective-free component of the crack thickness (for each centerline pixel), $\lambda_x$ is the measured crack thickness, $a_x$ is the angle between the camera orientation vector and the fitted plane's normal vector in the x direction, and x represents either the horizontal or vertical directions. For each centerline pixel, the resultant of the two perspective-free components is the crack thickness.

A user can interactively select a portion of a crack, and the proposed system will average the crack thicknesses for that region. This will improve the robustness of the system in the presence of noise.

Experimental Results

In order to evaluate the performance of thickness quantification methodologies described above, an experiment was performed as follows: synthetic cracks with thicknesses of 0.4, 0.6, 0.8, 1.0, 1.2, and 1.4 mm were drawn by a human operator using AutoCAD®, and printed using a 600 dpi HP LaserJet printer. Eighteen images with different camera poses were captured from the printed crack-like patterns to form six image sets. These images were in color, and they contained regular image noise. The crack edges were tapered in the captured images. Each image set consisted of three views, where the distance between two of the camera centers was known. The images were captured by a Canon PowerShot SX20 IS with a resolution of 2592×1944 pixels. For each image set, the SfM problem was solved and the camera-object distance was retrieved (as explained in Section 2.3). The working distances in this experiment varied between 725 mm to 1,760 mm. First, the cracks were extracted by a crack detection methodology described above. More than 10,000 measurements for each of the above thicknesses were carried out. A total of 70,721 thickness estimations were performed. To increase the robustness of the proposed thickness quantification system, thicknesses within a 5×5 neighborhood of each centerline were averaged. Statistical analysis of the collected data confirmed the effectiveness of the methodologies under review.

There can be many sources of error when quantifying a crack thickness using the above procedure, including bundle adjustment errors, scaling errors, crack orientation errors, and pixel representation errors (i.e., the number of pixels representing a thickness); however, the results of this experimental study indicate that the errors are quite reasonable, and they are amenable to improvement. Due to some rare irregularities in an extracted pattern, a small portion of the thinned image might not represent the exact centerline, which causes errors too. Averaging the neighboring thickness values may help get eliminate such outliers.

Figure 12:
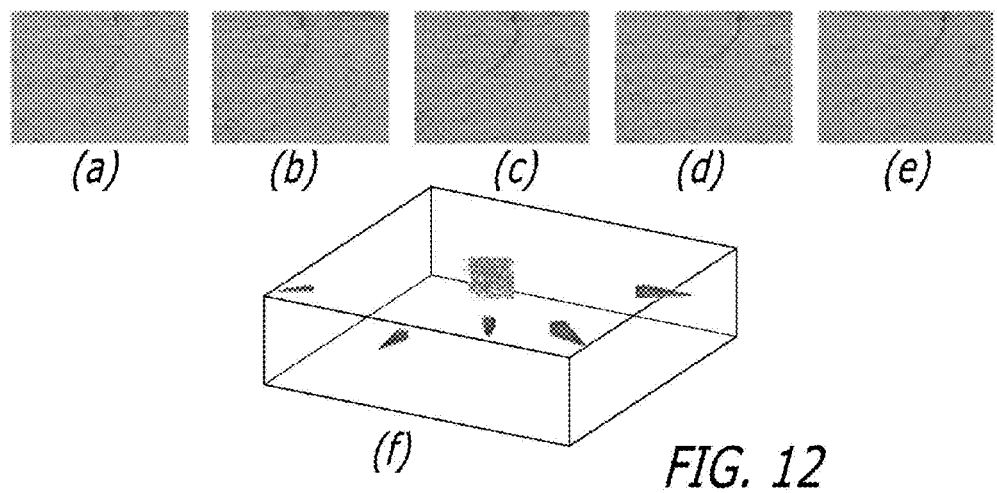
FIG. 12. shows a collection of views (a)-(e) of a scene including a crack, along with (f) the sparse 3D scene reconstruction and recovery of the camera poses.

In order to illustrate the capabilities, of crack quantification methodologies according to the invention, a real crack quantification experiment was performed as follows. Five images were taken from a concrete surface. The image acquisition system was identical to the one that was used in the first experiment. These images are shown in FIGS. 12 (a), (b), (c), (d), and (e). FIG. 12 (f) shows the reconstructed scene and recovered camera poses. The camera distance between the two side views (i.e., FIGS. 12 (a) and (e)) was 1600 mm.

Here, FIG. 12 (c) is an example used to quantify cracks. The retrieved working distance and focal length for this view were 966 mm and 15759 pixels, respectively. The working distance varied from 800 mm to 1400 mm.

In order to further evaluate the performance of the exemplary crack quantification methodologies, fifteen crack thicknesses were computed. As mentioned earlier, in practice there is no quantitative approach to quantify cracks in concrete structures. The following approach was used to obtain the ground truth about the computed thicknesses. First, a known length was attached to the region under inspection. Then, an image was captured where the view plane was parallel to the scene plane. The scale was computed as the ratio between the known length and number of pixels representing it. Finally, a thickness was determined by multiplying the number of pixels representing the thickness (which was counted manually) by the computed scale.

Crack thicknesses were computed using the quantification methodologies described for FIGS. 7-10. The results of the methodology of FIGS. 9-10 were seen to be closer to the ground truth with respect to the methodology of FIGS. 7-8. Both of the approaches were able to quantify real cracks with a reasonable accuracy. Furthermore, in most cases, the methodologies were seen to quantify the thickness slightly greater than its actual thickness, which is desirable (i.e., conservative) for crack monitoring applications. The maximum differences between the results from the first and the second methodologies, for this experiment, and the ground truth values were found to be 0.11 mm and 0.08 mm, respectively.

Figure 13:
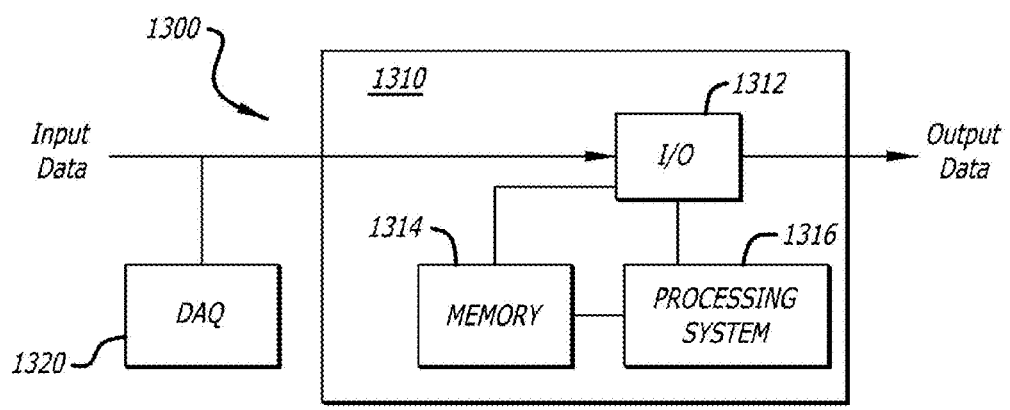
FIG. 13 illustrates a high-level block diagram of a system suitable for processing data in accordance with the present invention.

FIG. 13 illustrates a high-level block diagram of a system 1300 suitable for processing data in accordance with the present invention. System 1300 includes a processing portion 1310 that includes an input/output block 1312 that can receive input data, e.g., from an outside source, and produce an output of output data as shown. A memory unit 1314 is connected by a suitable bus or link to I/O block 1312. Memory unit 1314 can include or be composed of any suitable type of memory and/or memory structure. A processing system 1316 is connected to the memory unit 1314 and/or I/O block 1312. The processing system 1316 can include or be composed of one or more of any suitable type of processor, e.g., a central processing unit (CPU), an arithmetic processing unit (APU), a graphics processing unit (GPU), and the like. In some embodiments, system 1300 can also include a data acquisition system (1320) that functions to acquire data and provide such to the rest of the system 1300, e.g., via I/O block 1312. In exemplary embodiments, DAQ 1320 can include one or more cameras suitable for capturing one or more images of a scene of interest, e.g., one that include a structure that is suspected of having cracks. In some embodiments, system 1300 can receive a plurality of images as an input, process the images for crack detections in accordance with the present disclosure, and produce one or more multiscale crack maps as an output. In other or similar embodiments, system 1300 can receive one or more crack maps as an input, process such for crack quantification in accordance with the present disclosure, and produce one or more quantified crack maps indicating the quantified thickness for the crack(s).

Exemplary Embodiments:

While methodologies for both crack detection and crack quantification are generally described above in the context of working independently from one another, exemplary embodiments of the present invention utilize both crack quantification and crack detection as described herein. An example of such a methodology, described as an algorithm, is as follows:

Algorithm

Input: n images of a scene and the camera distance between two of the views.

For each view:

1. Establish the working distance and camera parameters by solving the SfM problem and scaling the reconstructed scene.

A. Crack Detection

2. Establish the appropriate structuring element based on the working distance and the focal length of the view, as well, as the crack thickness of interest;
3. Segment the potential crack patterns by applying the described morphological operation in (3) on the image;
4. Compute and assign appropriate features to each segmented pattern;
5. Classify cracks from non-crack patterns using a trained classifier (NN or SVM);
6. Repeat steps 2 through 5 for different crack thicknesses of interest and generate the multi-scale crack map as the union of all extracted crack pixels.

Output: the multi-scale crack map

B. Crack Quantification

7. Extract the centerline of each extracted crack using the morphological thinning operation;
8. Find the tangential orientation for each centerline pixel by correlating different orientational kernels with the binary crack map;
9. Estimate the thickness orientation as the perpendicular orientation to the tangent at each centerline pixel;
10. For each centerline pixel, compute the crack pixels that are aligned with the thickness orientation;
11. Compensate for the perspective error by aligning the view plane with the object plane;
12. Compute the thickness in unit length by multiplying the measured thickness in pixels by the ratio between the working distance and the focal length;
13. Average the measured thicknesses in a small neighborhood to improve the robustness of the quantification system.

Output: the crack thickness values

Accordingly, various benefits and advantages may be achieved through use of aspects and embodiments of the present invention.

Unless otherwise indicated, the method, techniques, and methodologies of crack detection and/or quantification that have been discussed herein are implemented with a computer system configured to perform the functions that have been described herein for the component. Each computer system includes one or more processors, tangible memories (e.g., random access memories (RAMs), read-only memories (ROMs), and/or programmable read only memories (PROMS)), tangible storage devices (e.g., hard disk drives, CD/DVD drives, and/or flash memories), system buses, video processing components, network communication components, input/output ports, and/or user interface devices (e.g., keyboards, pointing devices, displays, microphones, sound reproduction systems, and/or touch screens).

Each computer system for implementing the methodologies of crack detection and/or quantification may be or include a desktop computer or a portable computer, such as a laptop computer, a notebook computer, a tablet computer, a PDA, a smartphone, or part of a larger system, such a vehicle, appliance, and/or telephone system.

A single computer system may be shared or networked for implementing the subject technology described herein.

Each computer system for implementing the subject technology may include one or more computers at the same or different locations. When at different locations, the computers may be configured to communicate with one another through a wired and/or wireless network communication system.

Each computer system may include software (e.g., one or more operating systems, device drivers, application programs, and/or communication programs). When software is included, the software includes programming instructions and may include associated data and libraries. When included, the programming instructions are configured to implement one or more algorithms that implement one or more of the functions of the computer system, as recited herein. The description of each function that is performed by each computer system also constitutes a description of the algorithm(s) that performs that function.

The software may be stored on or in one or more non-transitory, tangible storage devices, such as one or more hard disk drives, CDs, DVDs, and/or flash memories. The software may be in source code and/or object code format. Associated data may be stored in any type of volatile and/or non-volatile memory. The software may be loaded into a non-transitory memory and executed by one or more processors.

The components, steps, features, objects, benefits, and advantages that have been discussed are merely illustrative. None of them, nor the discussions relating to them, are intended to limit the scope of protection in any way. Numerous other embodiments are also contemplated. These include embodiments that have fewer, additional, and/or different components, steps, features, objects, benefits, and advantages. These also include embodiments in which the components and/or steps are arranged and/or ordered differently.

For example, while detection and quantification methodologies have been described herein in the context of cracks (e.g., in structures), these methodologies may be effective for other pattern analysis purposes, e.g., texture analysis. Moreover, while embodiments above are described as utilizing the SfM problem to derive a reconstructed 3D structure to obtain image acquisition parameters or geometry of a scene; as was noted previously, the geometric relation between image acquisition parameters (e.g., working distance from camera to object, focal length, etc.) and imaged object(s) can be obtained by other suitable means, e.g., with manual or user-obtained measurements such as with a laser range-finder or other measuring apparatus such as measuring tape. Thus, these other methods and their equivalents may be used with crack detection and/or crack quantification according to the present invention.

Unless otherwise stated, all measurements, values, ratings, positions, magnitudes, sizes, and other specifications that are set forth in this specification, including in the claims that follow, are approximate, not exact. They are intended to have a reasonable range that is consistent with the functions to which they relate and with what is customary in the art to which they pertain.

Any and all articles, patents, patent applications, and other publications that have been cited in this disclosure are incorporated herein by reference in their respective entirety.

The phrase "means for" when used in a claim is intended to and should be interpreted to embrace the corresponding structures and materials that have been described and their equivalents. Similarly, the phrase "step for" when used in a claim is intended to and should be interpreted to embrace the corresponding acts that have been described and their equivalents. The absence of these phrases from a claim means that the claim is not intended to and should not be interpreted to be limited to these corresponding structures, materials, or acts, or to their equivalents.

The scope of protection is limited solely by the claims that now follow. That scope is intended and should be interpreted to be as broad as is consistent with the ordinary meaning of the language that is used in the claims when interpreted in light of this specification and the prosecution history that follows, except where specific meanings have been set forth, and to encompass all structural and functional equivalents.

Relational terms such as "first" and "second" and the like may be used solely to distinguish one entity or action from another, without necessarily requiring or implying any actual relationship or order between them. The terms "comprises," "comprising," and any other variation thereof when used in connection with a list of elements in the specification or claims are intended to indicate that the list is not exclusive and that other elements may be included. Similarly, an element preceded by an "a" or an "an" does not, without further constraints, preclude the existence of additional elements of the identical type.

None of the claims are intended to embrace subject matter that fails to satisfy the requirement of Sections 101, 102, or 103 of the Patent Act, nor should they be interpreted in such a way. Any unintended coverage of such subject matter is hereby disclaimed. Except as just stated in this paragraph, nothing that has been stated or illustrated is intended or should be interpreted to cause a dedication of any component, step, feature, object, benefit, advantage, or equivalent to the public, regardless of whether it is or is not recited in the claims.

The abstract is provided to help the reader quickly ascertain the nature of the technical disclosure. It is submitted with the understanding that it will not be used to interpret or limit the scope or meaning of the claims. In addition, various features in the foregoing detailed description are grouped together in various embodiments to streamline the disclosure. This method of disclosure should not be interpreted as requiring claimed embodiments to require more features than are expressly recited in each claim. Rather, as the following claims reflect, inventive subject matter lies in less than all features of a single disclosed embodiment. Thus, the following claims are hereby incorporated into the detailed description, with each claim standing on its own as separately claimed subject matter.

What is claimed is:

1. A system for crack quantification, the system comprising:
a storage device;
a processing system connected to the storage device; and a program stored in the storage device, wherein execution of the program by the processor configures the system to perform functions, including functions to:
(i) extract, from a binary crack map, a centerline of an extracted crack using a morphological thinning operation;
(ii) determine a minimum area orientation as being equal to an orientational strip kernel having a width and a minimum correlation value from among a set of a plurality of orientational strip kernels when each is correlated with the binary crack map, wherein the minimum correlation value is the area of the crack bounded between strip edges; and
(iii) for each centerline pixel, determine a measured thickness as the minimum correlation value divided by the width of the corresponding strip kernel.

2. The system of claim 1, wherein the program further includes instructions such that execution of the program by the processor configures the system to perform further functions to: (iv) determine the thickness in unit length by multiplying the measured thickness in pixels by the ratio between the working distance and the focal length.

3. The system of claim 1, wherein the program further includes instructions such that execution of the program by the processor configures the system to perform further functions to: compensate for the perspective error by aligning the view plane with the object plane.

4. The system of claim 3, wherein the perspective error is determined in accordance with the following:

$$\lambda'_x = \frac{\lambda_x}{\cos\alpha_x},$$

where $\lambda_x$ is the perspective-free component of the crack thickness for each centerline pixel, $\lambda_x$ is the measured crack thickness, $a_x$ is the angle between the camera orientation vector and normal vector in the x direction of the fitted plane, and x represents either the horizontal or vertical directions.

5. The system of claim 1, wherein the instructions for (iii) include instructions to, for each centerline pixel, taking the projection of the length, in number of pixels, in a specified direction along the corresponding thickness orientation.

6. The system of claim 5, wherein the specified direction is the vertical direction or y-axis.

7. The system of claim 5, wherein the specified direction is the horizontal direction or x-axis.

8. The system of claim 1, wherein the set of orientational kernels comprise 35 kernels representing equally-incremented orientations from 0° to 175°.

9. A method of quantifying a crack, the method comprising:
extracting a centerline of an extracted crack from a binary crack map using a morphological thinning operation;
determining a minimum area orientation as the orientational strip kernel having a width and a minimum correlation value from among a set of orientational strip kernels when each is correlated with the binary crack map, wherein the minimum correlation value is the area of the crack bounded between strip edges; and
for each centerline pixel, determining a measured thickness as the minimum correlation value divided by the width of the corresponding strip kernel.

10. The method of claim 9, further comprising determining the thickness in unit length by multiplying the measured thickness in pixels by the ratio between the working distance and the focal length.

11. The method of claim 9, wherein for each centerline pixel, determining a measured thickness comprises taking the projection of the measured length, in number of pixels, in a specified direction along the corresponding thickness orientation.

12. The method of claim 11, wherein the specified direction is the vertical direction or y-axis.

13. The method of claim 11, wherein the specified direction is the horizontal direction or x-axis.

14. The method of claim 9, further comprising:
solving a structure from motion (SfM) problem based on a plurality of images of a scene including the crack;
reconstructing the three-dimensional structure of the scene; and
determine focal length, camera center, and camera orientation.

15. The method of claim 11, further comprising using scale-invariant feature transform (SIFT) keypoints matched between pairs of images.

16. The method of claim 12, further comprising using the random sample consensus (RANSAC) algorithm is exclude outliers.

* * * * *